(12) United States Patent
Bartek et al.

(10) Patent No.: US 9,040,761 B2
(45) Date of Patent: May 26, 2015

(54) CO-PROCESSING OF BIOMASS AND SYNTHETIC POLYMER BASED MATERIALS IN A PYROLYSIS CONVERSION PROCESS

(75) Inventors: Robert Bartek, Centennial, CO (US); Steve Yanik, Colorado Springs, CO (US)

(73) Assignee: KiOR, Inc., Pasadena, TX (US)

( * ) Notice: Subject to any disclaimer, the term of this patent is extended or adjusted under 35 U.S.C. 154(b) by 322 days.

(21) Appl. No.: 13/578,790

(22) PCT Filed: Feb. 11, 2011

(86) PCT No.: PCT/US2011/024428
§ 371 (c)(1),
(2), (4) Date: Oct. 23, 2012

(87) PCT Pub. No.: WO2011/103026
PCT Pub. Date: Aug. 25, 2011

(65) Prior Publication Data
US 2013/0204054 A1    Aug. 8, 2013

Related U.S. Application Data

(60) Provisional application No. 61/304,966, filed on Feb. 16, 2010.

(51) Int. Cl.
| | | |
|---|---|---|
| C07C 1/20 | (2006.01) |
| C10G 1/06 | (2006.01) |
| C10G 1/00 | (2006.01) |
| C10G 1/08 | (2006.01) |
| C10G 1/10 | (2006.01) |
| C10G 3/00 | (2006.01) |
| C07C 1/207 | (2006.01) |
| C07C 1/213 | (2006.01) |
| C10L 1/00 | (2006.01) |
| C10L 1/14 | (2006.01) |
| C10L 1/16 | (2006.01) |

(52) U.S. Cl.
CPC .. *C10G 1/06* (2013.01); *C10G 1/00* (2013.01); *C10G 1/08* (2013.01); *C10G 1/10* (2013.01); *C10G 3/42* (2013.01); *C10G 2300/1011* (2013.01)

(58) Field of Classification Search
CPC .............. C10L 1/00; C10L 1/14; C10L 1/16; C10M 101/02; C10M 107/20; C10M 107/22; C10M 107/26; C10M 107/28; C07C 1/20; C07C 1/207; C07C 1/213
USPC ........... 585/14, 240–242, 357, 469, 638, 733; 44/605–606
See application file for complete search history.

(56) References Cited

U.S. PATENT DOCUMENTS 4,584,421 A * 4/1986 Saito et al. ..................... 585/241
4,678,860 A * 7/1987 Kuester ............................ 585/14
(Continued)

FOREIGN PATENT DOCUMENTS

| WO | WO 2007/128798 A1 * | 11/2007 | ............... C10G 1/00 |
| WO | WO 2010/071677 A1 * | 6/2010 | ............. C10B 53/08 |
| WO | PCT/US11/024428 | 4/2011 | |

*Primary Examiner* — Brian McCaig
(74) *Attorney, Agent, or Firm* — Dunlap Codding, P.C.

(57) ABSTRACT

Disclosed is a process for biomass conversion which includes co-processing the biomass with thermoplastic and non-thermoplastic polymer based materials in a catalytic pyrolysis reactor to convert such to liquid hydrocarbons; wherein hydrogen atoms originating with the polymer materials can remove oxygen from oxygenated hydrocarbons produced in the conversion of the biomass in the reactor.

16 Claims, 1 Drawing Sheet

(56) References Cited

U.S. PATENT DOCUMENTS

| | | |
|---|---|---|
| 2008/0299021 A1 | 12/2008 | Boykin et al. |
| 2009/0007484 A1 | 1/2009 | Smith |
| 2009/0139851 A1* | 6/2009 | Freel ............................... 201/23 |
| 2009/0253948 A1 | 10/2009 | McCall et al. |
| 2009/0286295 A1 | 11/2009 | Medoff et al. |
| 2010/0256428 A1 | 10/2010 | Marker et al. |

* cited by examiner

US 9,040,761 B2

CO-PROCESSING OF BIOMASS AND SYNTHETIC POLYMER BASED MATERIALS IN A PYROLYSIS CONVERSION PROCESS

This application is the U.S. National Phase application under 35 U.S.C. §371 of International Application No. PCT/US11/24428, filed Feb. 11, 2011, which in turn claims priority to the benefit of U.S. provisional patent application 61/304,966, filed Feb. 16, 2010, the entire contents of which are hereby expressly incorporated herein by reference.

BACKGROUND OF THE INVENTION

1. Field of the Invention

The invention relates generally to the conversion of a mixture of biomass and a synthetic polymer based material in the presence of a catalyst, and more particularly to the conversion of a mixture of biomass and a synthetic polymer based material in an oxygen-poor or oxygen-free pyrolysis reactor.

2. Description of the Related Art

Pyrolysis, in particular flash pyrolysis, has been proposed as a process for converting solid biomass material to liquid products. Pyrolysis in general refers to a process in which a feedstock is heated in an oxygen-poor or oxygen-free atmosphere. If solid biomass is used as the feedstock of a pyrolysis process, the process produces gaseous, liquid, and solid products. It has been found that the liquid yield can be increased, at the expense of the gas and solid yields, by operating the pyrolysis process such that the feedstock is heated rapidly, and the reaction time is kept short. In flash pyrolysis the time for heating and reacting the biomass feedstock is on the order of seconds.

Because of the fuel quality benefits of reducing the oxygen content of biomass derived oil, it is desirable to develop improved methods/systems for biomass conversion wherein oxygen is removed from the resulting conversion products.

BRIEF SUMMARY OF THE INVENTION

In accordance with an embodiment of the present invention, a process is provided comprising charging a feed comprising a biomass and a synthetic thermoplastic polymer based material to a reactor for contact with a catalyst and conversion to a product comprising liquid hydrocarbons; wherein the weight ratio of the biomass to the synthetic thermoplastic polymer based material is greater than about 1:4.

In accordance with an embodiment of the present invention, a process/system is provided including:
i) charging a feed selected from the group consisting of: 1) a biomass, 2) a biomass and a synthetic polymer based material, and 3) combinations thereof, to a first reactor for contact with a heat carrier material and conversion to a product comprising oxygenated hydrocarbons;
ii) charging at least a portion of the product to a second reactor along with a synthetic thermoplastic polymer based material for contact with a second reactor catalyst and conversion of the synthetic thermoplastic polymer based material to liquid hydrocarbons; and
iii) removing a second reactor bio-oil from the second reactor.

BRIEF DESCRIPTION OF THE DRAWINGS

The features and advantages of the invention will be appreciated upon reference to the following drawings, in which.

DETAILED DESCRIPTION OF THE INVENTION

Figure 1:
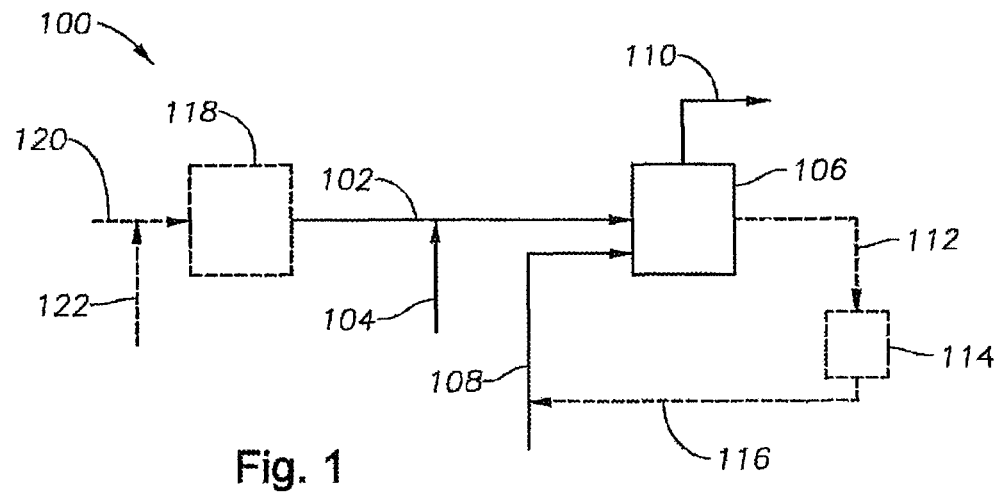
FIG. 1 is a flow diagram showing an embodiment of the present invention.

The biomass material useful in the current invention can be any biomass capable of being converted to liquid and gaseous hydrocarbons.

Preferred are solid biomass materials comprising cellulose, in particular lignocellulosic materials, because of the abundant availability of such materials, and their low cost. Examples of suitable solid biomass materials include forestry wastes, such as wood chips and saw dust; agricultural waste, such as straw, corn stover, sugar cane bagasse, municipal waste, in particular yard waste, paper, and card board; energy crops such as switch grass, coppice, eucalyptus; and aquatic materials such as algae; and the like.

A feed comprising a biomass and a synthetic thermoplastic polymer based material are charged to a reactor for contact with a catalyst and conversion to a product comprising liquid hydrocarbons. The weight ratio of the biomass to the synthetic thermoplastic polymer based material is preferably greater than about 1:4, or greater than about 1:2, or greater than about 1:1. Further, hydrogen atoms originating with the synthetic thermoplastic polymer based material can remove oxygen from oxygenated hydrocarbons produced in the conversion of the biomass in the reactor.

The feed can further comprise materials selected from the group consisting of paper, cotton, and combinations thereof.

Typical synthetic thermoplastic polymer based materials include, but are not limited to, polyethylene and polypropylene. The synthetic thermoplastic polymer based materials can be selected from the group consisting of polyethylene, polypropylene, and combinations thereof. The synthetic thermoplastic polymer based material preferably comprises at least about 10 wt. % hydrogen.

The reactor can be a fluid bed reactor, a moving bed reactor, or a cyclone reactor. The reactor can be operated at a temperature of from about 150 to about 600° C., preferably from about 250 to about 550° C.

Preferred processes for the conversion of solid biomass material comprise pyrolysis of the biomass material, that is, heating of the biomass material in an oxygen-poor or oxygen-free atmosphere. The term "oxygen-poor" as used herein refers to an atmosphere containing less oxygen than ambient air. In general, the amount of oxygen should be such as to avoid combustion of the biomass material, or vaporized and gaseous products emanating from the biomass material, at the pyrolysis temperature. Preferably the atmosphere is essentially oxygen-free, that is, contains less than about 1 wt % oxygen.

The catalyst can be selected from the group consisting of: a solid base, a clay, an inorganic oxide, an inorganic hydroxide, a zeolite, a supported metal, and combinations thereof. The solid base can be selected from the group consisting of: hydrotalcite; a hydrotalcite-like material; a clay; a layered hydroxy salt; a metal oxide; a metal hydroxide; a mixed metal oxide; or a mixture thereof.

The catalyst can also be an equilibrium catalyst ("E-cat") from a fluid catalytic cracking ("FCC") unit of an oil refinery. The term refers to catalyst material that has, on average, circulated in the FCC unit for a considerable length of time. The term is used to distinguish fresh catalyst, which has not been exposed to the environment of the FCC unit, and which has much greater catalytic activity than the E-cat. The term E-cat also refers to catalyst material that is removed from the FCC unit, to be replaced with fresh catalyst. This spent catalyst is a waste product from oil refineries, and as such, is abundantly available at low cost. It has been found that the reduced catalytic activity of E-cat is in fact of particular advantage in the pyrolysis process.

Rapid heating of the solid biomass material can generally be accomplished by providing the solid biomass material in the form of particles having a low mean particle diameter. Preferably, the mean particle diameter of the biomass is less than about 500 µm, and more preferably less than about 125 µm.

The biomass portion of the feed can also be subjected to pretreatment prior to charging to the reactor. The pretreatment can comprise a method selected from the group consisting of: a) drying; b) heat treatment in an oxygen-poor or oxygen-free atmosphere; c) solvent explosion; d) mechanical treatment with catalyst particles which can be carried out in a mixer, a mill, a grinder, or a kneader; e) demineralization; f) swelling in an aqueous solvent; g) impregnation of catalytic agents, mineral acids, organic acids, mineral bases; or h) a combination thereof.

Demineralization may be accomplished by swelling the biomass material with an aqueous solvent, and subsequently removing at least part of the aqueous solvent by mechanical action.

Suitable examples of mechanical action include kneading, grinding, milling, pressing and shredding. In a preferred embodiment the mechanical action is carried out in the presence of a particulate inorganic material, preferably a catalyst for the subsequent pyrolysis reaction.

The mechanical treatment described above can form an activated feed: a) coated with said catalyst particles, or b) having said catalyst particles embedded therein, or c) both a) and b).

The term "solvent explosion" refers to a process by which the biomass material is contacted with a solvent in its liquid form, under pressure, at a temperature which is above the normal boiling point of the solvent. After the solvent is allowed to penetrate the biomass material, the pressure is released precipitously, resulting in a rapid evaporation of the solvent. The resulting pressure build-up in the pores of the biomass material can result in a rupturing of the structure of the biomass material, making it more susceptible to the subsequent size reduction and pyrolysis reaction.

The heat treatment can be at a temperature in the range of from 90 to 300° C. In one preferred embodiment the heat treatment is at a temperature in the range of from 90 to 200° C., more preferably from 110 to 160° C. The heat treatment results in a modification of the structure of the biomass material, making it significantly more susceptible to mechanical action.

Examples of suitable materials for impregnation into the biomass include sulfuric acid; ammonia; alkali metal and earth alkaline hydroxides; alkali metal and earth alkaline carbonates; hydrochloric acid; acetic acid; and the like. It should be noted that acetic acid, together with the other lower carboxylic acids (formic acid; propionic acid), although organic materials, are considered inorganic acids in this context.

In accordance with an embodiment of the present invention, a process/system for converting biomass to liquid hydrocarbons comprises, consists of, or consists essentially of the following, described below with reference to FIG. 1.

A biomass conversion process/system 100 wherein biomass is charged to a conduit 102, and a synthetic thermoplastic polymer based material is charged to conduit 102 via conduit 104. The mixture of the biomass and synthetic thermoplastic polymer based material is charged as a feed to a reactor 106 via conduit 102. A catalyst is charged to reactor 106 via conduit 108 for mixture with the feed, and a product is removed from reactor 106 via conduit 110. Optionally, cooled catalyst is removed from reactor 106 via conduit 112, heated by burning off coke in a heating zone 114, and charged to reactor 106 via conduits 116 and 108 as at least a part of the catalyst charged to reactor 106. The process/system 100 can optionally include charging the biomass to a pre-treatment section 118 via conduit 120 for pre-treatment of the biomass. Also optionally, a catalyst can be charged to conduit 120 via conduit 122 for mixture with the biomass prior to pre-treatment in pre-treatment section 118. The pre-treated biomass can then be charged from pre-treatment section 118 to conduit 102 as at least a part of the biomass fed to reactor 106.

Figure 2:
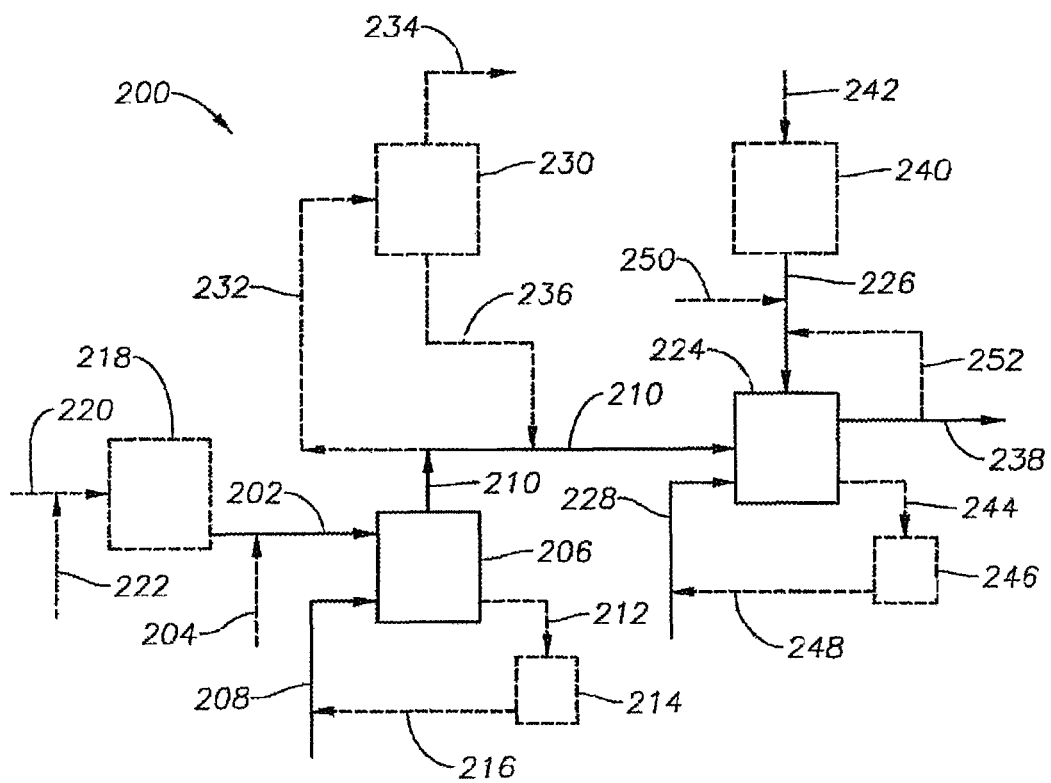
FIG. 2 is a flow diagram showing an embodiment of the present invention.

In accordance with an embodiment of the present invention, a process/system for converting biomass to liquid hydrocarbons comprises, consists of, or consists essentially of the following, described below with reference to FIG. 2.

A biomass conversion process/system 200 wherein biomass is charged to a conduit 202, and a synthetic polymer based material selected from the group consisting of polyester, poly (methyl methacrylate), terephthalates, polycarbonates, polyvinylacetates, polystyrene, poly (styrene-butadiene-styrene), styrene-butadiene rubber, nylons, polyethylene, polyurethane prepolymer, polystyrene, polypropylene, acrylic resins, and combinations thereof, is optionally charged to conduit 202 via conduit 204. The biomass or the mixture of the biomass and synthetic polymer based material is charged as a feed to a first reactor 206 via conduit 202. A heat carrier material is charged to first reactor 206 via conduit 208 for mixture with the feed, and a product is removed from first reactor 206 via conduit 210. Optionally, cooled heat carrier material is removed from first reactor 206 via conduit 212, heated by the burning of coke in a heating zone 214, and charged to first reactor 206 via conduits 216 and 208 as at least a part of the heat carrier material. The process/system 200 can optionally include charging the biomass to a pre-treatment section 218 via conduit 220 for pre-treatment of the biomass. Also optionally, heat carrier material can be charged to conduit 220 via conduit 222 for mixture with the biomass prior to pre-treatment in pre-treatment section 218. The pre-treated biomass can then be charged from pre-treatment section 218 to conduit 202 as at least a part of the biomass fed to first reactor 206.

At least a portion of the product is charged to a second reactor 224 via conduit 210, a synthetic thermoplastic polymer based material, as described above, is charged to second reactor 224 via conduit 226, and a catalyst is charged to second reactor 224 via conduit 228, wherein the synthetic thermoplastic polymer based material is converted to liquid hydrocarbons. Preferably, hydrogen atoms originating with the synthetic thermoplastic polymer based material remove oxygen from the oxygenated hydrocarbons contained in the product charged to second reactor 224.

Optionally, at least a portion of the product is charged to a separation zone 230 via conduit 232 for separation into a first reactor bio-oil removed from separation zone 230 via conduit 234 and into a heavy hydrocarbon stream comprising oxygenated hydrocarbons removed via conduit 236. The heavy hydrocarbon stream is optionally charged to second reactor 224 as at least a portion of the product from first reactor 206 via conduits 236 and 210.

A second reactor bio-oil is removed from second reactor 224 via conduit 238 having a lower concentration of oxygenated hydrocarbons than the concentration of oxygenated hydrocarbons of the combination of the synthetic thermoplastic polymer based material and the product charged to second reactor 224. Optionally, the synthetic thermoplastic polymer based material is charged to a shredder 240 via conduit 242 for shredding into smaller particles prior to charging to second reactor 224 via conduit 226.

Optionally, cooled catalyst is removed from second reactor 224 via conduit 244, heated by burning of coke in a heating zone 246, and charged to second reactor 224 via conduits 248 and 228 as at least a part of the catalyst.

In a preferred embodiment the first reactor bio-oil and the second reactor bio-oil each separately have an oxygen content (based on dry bio-oil) of less than 20 wt %, preferably less than 15 wt %, more preferably less than 10 wt %. Low oxygen contents are evidenced by low Total Acid Numbers ("TAN"), defined as the amount of KOH (in mg) necessary to neutralize 1 g of the bio-oil. The bio-oils can have a TAN of less than 30, preferably less than 20, more preferably less than 10, still more preferably less than 5.

The first and second reactors can each separately be a fluid bed reactor, a moving bed reactor, or a cyclone reactor.

The first reactor is operated at a temperature of from about 150 to about 600° C., preferably from about 250 to about 550° C., and in an oxygen-poor or oxygen-free atmosphere.

The second reactor is operated at a temperature of from about 470 to about 600° C., preferably from about 520 to about 570° C., and in an oxygen-poor or oxygen-free atmosphere.

Optionally, prior to charging to the second reactor 224 via conduit 226, a petroleum fraction and/or a portion of the second reactor bio-oil is mixed with the synthetic thermoplastic polymer based material via conduits 250 and 252, respectively.

The weight ratio of biomass to synthetic polymer based material charged to the first reactor can be greater than about 1:4, or greater than about 1:2, or greater than about 1:1. Also, the biomass can be subjected to pretreatment prior to charging to the first reactor, as described above.

The heat carrier material can be a catalyst as described above, or sand, or a combination thereof. The second reactor catalyst can be a catalyst as described above.

The feed charged to first reactor 206 via conduit 202 can further comprise materials selected from the group consisting of paper, cotton, and combinations thereof.

While the technology has been particularly shown and described with reference to specific embodiments, it should be understood by those skilled in the art that various changes in form and detail may be made without departing from the spirit and scope of the technology as defined by the appended claims.

What is claimed is:
1. A process, comprising:
 i) charging a feed to a first reactor for contact with a heat carrier material and conversion of the feed to a product comprising oxygenated hydrocarbons, wherein the feed comprises at least one of (a) a biomass, and (b) a biomass and a synthetic polymer;
 ii) charging at least a portion of said product to a second reactor along with a synthetic thermoplastic polymer based material for contact with a second reactor catalyst and conversion of said synthetic thermoplastic polymer based material to liquid hydrocarbons; and
 iii) removing a second reactor bio-oil from said second reactor.

2. The process of claim 1 wherein hydrogen atoms originating from said synthetic thermoplastic polymer based material remove oxygen from said oxygenated hydrocarbons contained in said product; and wherein said second reactor bio-oil has a lower concentration of oxygenated hydrocarbons than the concentration of oxygenated hydrocarbons of the combination of said synthetic thermoplastic polymer based material and said product charged to said second reactor.

3. The process of claim 1 wherein at least a portion of said product from step i) is separated into (1) a heavy hydrocarbon stream comprising oxygenated hydrocarbons and (2) a first reactor bio-oil; and wherein said heavy hydrocarbon stream is charged to said second reactor in step ii) as at least a portion of said product charged to said second reactor.

4. The process of claim 1 wherein said first reactor and said second reactor are each separately either a fluid bed reactor, a moving bed reactor, or a cyclone reactor.

5. The process of claim 1 wherein said first reactor is operated at a temperature of from about 150 to about 600° C. and in an oxygen-poor atmosphere.

6. The process of claim 1 wherein said first reactor is operated at a temperature of from about 250 to about 550° C. and in an oxygen-poor atmosphere.

7. The process of claim 1 wherein said second reactor is operated at a temperature of from about 470 to about 600° C. and in an oxygen-poor atmosphere.

8. The process of claim 1 wherein said second reactor is operated at a temperature of from about 520 to about 570° C. and in an oxygen-poor atmosphere.

9. The process of claim 1 wherein, prior to charging to said second reactor, said synthetic thermoplastic polymer based material is shredded and mixed with a hydrocarbon selected from the group consisting of: i) a portion of said second reactor bio-oil, ii) a petroleum fraction, and iii) a combination thereof.

10. The process of claim 1 wherein said biomass is subjected to pretreatment prior to charging to said first reactor; wherein said pretreatment comprises a method selected from the group consisting of: a) drying; b) heat treatment in an oxygen-poor or oxygen-free atmosphere; c) solvent explosion; d) mechanical treatment with catalyst particles; e) demineralization; f) swelling in an aqueous solvent; g) impregnation of catalytic agents, mineral acids, organic acids, or mineral bases, and h) combinations thereof.

11. The process of claim 1 wherein said heat carrier material is a catalyst selected from the group consisting of a solid base, a clay, an inorganic oxide, an inorganic hydroxide, a zeolite, a supported metal, and combinations thereof.

12. The process of claim 1 wherein said second reactor catalyst is selected from the group consisting of a solid base, a clay, an inorganic oxide, an inorganic hydroxide, a zeolite, a supported metal, and combinations thereof.

13. The process of claim 1 wherein said heat carrier material is sand.

14. The process of claim 1 wherein said synthetic polymer based material is selected from the group consisting of polyester, poly (methyl methacrylate), terephthalates, polycarbonates, polyvinylacetates, polystyrene, poly (styrene-butadiene-styrene), styrene-butadiene rubber, nylons, polyethylene, polyurethane prepolymer, polystyrene, polypropylene, acrylic resins, and combinations thereof.

15. The process of claim 1 wherein said synthetic thermoplastic polymer based material is selected from the group consisting of polyethylene, polypropylene, and combinations thereof.

16. The process of claim 1 wherein said feed further comprises materials selected from the group consisting of paper, cotton, and combinations thereof.

* * * * *